3,531,866
DIRECT READING TECHNIQUE CALIPER FOR X-RAY MACHINES
Robert E. Lawler and Lavona Sue Lawler, both of 4616 Priscilla, Wichita Falls, Tex. 76306
Filed June 11, 1969, Ser. No. 832,103
Int. Cl. G01b 5/00
U.S. Cl. 33—143                1 Claim

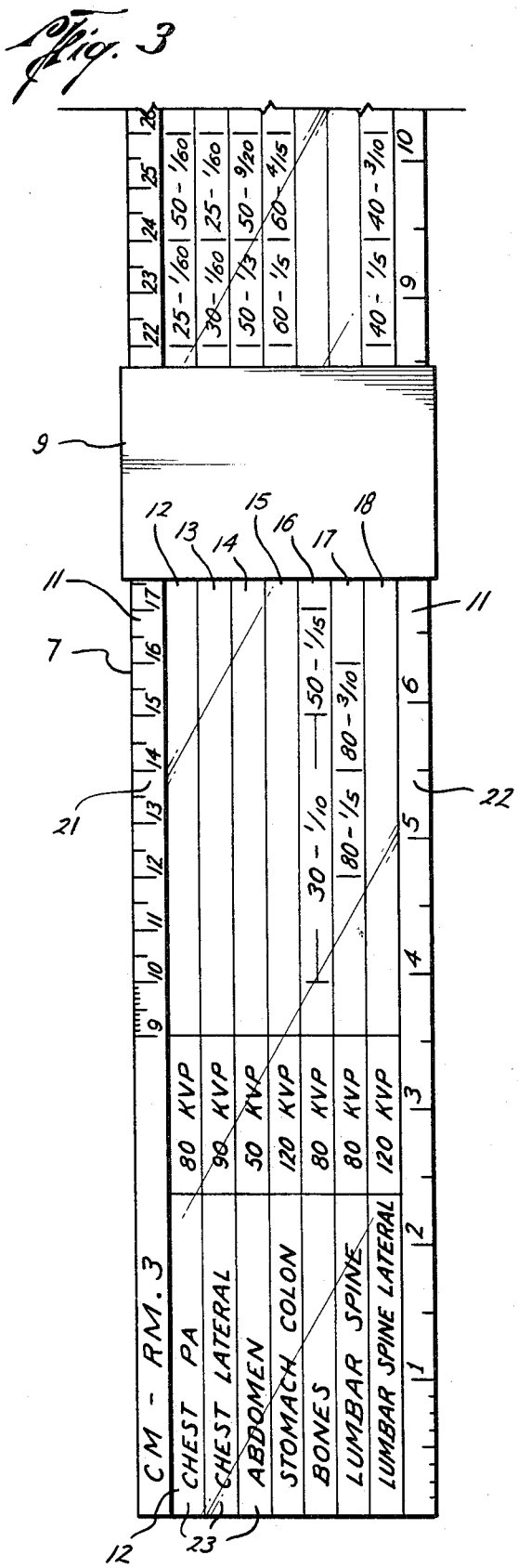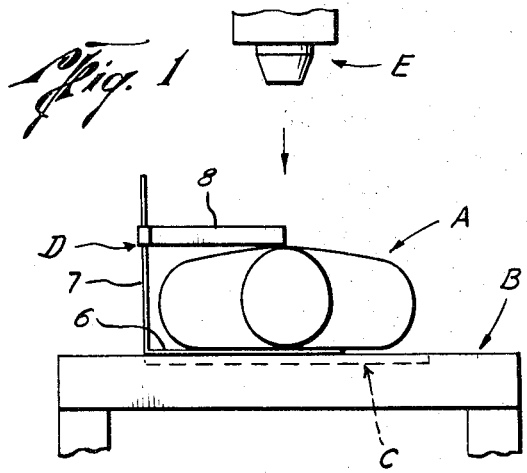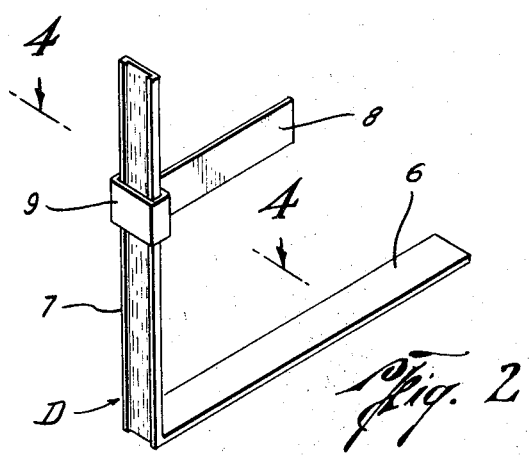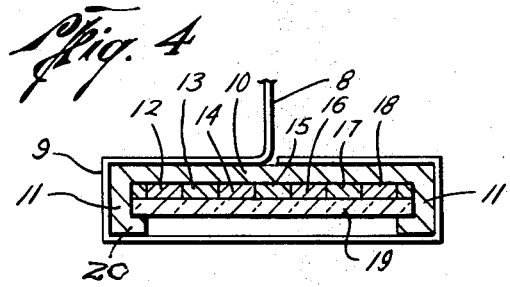
Robert E. Lawler
Lavona Sue Lawler
INVENTORS
BY Bertram H. Mann
ATTORNEY ; # United States Patent Office 3,531,866
Patented Oct. 6, 1970

ABSTRACT OF THE DISCLOSURE

A radiologist's caliper, comprising an opposed slidable jaw and a fixed jaw on an elongated data bar. On the data bar a plurality of separate strips having thereon voltage and current-time settings are slidably held for coordination with various anatomical measurements wherein the strips are adjustable for a particular X-ray machine.

BACKGROUND OF THE INVENTION

This invention relates to caliper devices for use in obtaining exposure settings of X-ray machines, and consists particularly in a novel caliper which directly and simply indicates optimum voltage and current-time settings.

There is a general reluctance on the part of some radiological technicians to measure patients for various procedures, such measurements being estimated. If the technician is not experienced, this will result in many radiographs being produced which may be of poor or sub-optimal quality. Even for the experienced technician, the degree of error inherent in guessing which settings to use will often result in radiographs being of nonconsistent quality. One of the major reasons for this failure is that the busy technician often must examine one or more technique charts or books in order to convert the pertinent measurement of the part to be X-rayed into the kilovoltage peak (kv.p.) and milliampere-time (ma.s factors needed for the particular examination. This often will require 15 to 30 seconds in order to find the exact factors needed. Other reasons are that no two X-ray machines operate exactly alike, and different radiologists may desire different shades of darkness in the developed film.

SUMMARY OF THE INVENTION

The main object of the present invention is to provide a measuring device or caliper which can be calibrated in accordance with the characteristics of a specific X-ray machine or group of machines and which will directly indicate the exposure factors which must be applied in making a proper diagnostic examination of a particular body part.

A more specific object is to avoid the rather tedious necessity of translating inch or centimeter measurements of a body part into X-ray machine exposure factors, first by reference to general charts customarily available and then the application of correction factors usually necessary because of the characteristics of the particular equipment used.

In accordance with the present invention, a caliper is provided having an elongated data bar portion and a laterally projecting base arm at one end. On the face of the data bar there are provided individually adjustable longitudinal rows each containing a designation of a particular X-ray examination, a designation of a fixed kilovoltage or milliampere-seconds value, and serially coordinate milliampere-second or kilovoltage values determined in accordance with respective distances from the base arm. A slider arm carried by the data bar moves along the bar to register the pertinent measurement of the part to be X-rayed, and at the same time to directly indicate the variable exposure value which, in cooperation with the fixed exposure value as mentioned, will insure an exposure of diagnostic quality.

BRIEF DESCRIPTION OF THE DRAWINGS

In the accompanying drawings:
FIG. 1 is a schematic view illustrating the use of the novel caliper.
FIG. 2 is an enlarged perspective view of the caliper.
FIG. 3 is a still further enlarged view of the data face of the caliper.
FIG. 4 is an enlarged section taken on line 4—4 of FIG. 2.

FIG. 1 illustrates a human body A resting on a table B in which is mounted in the customary manner an unexposed X-ray film C. The novel caliper, generally designated D, has a base arm 6 projecting laterally from one end of upright data bar 7 and a sliding arm 8. At E there is shown the portion of the X-ray machine which directs the X-ray beam through the body part of interest and against X-ray plate C for exposure thereof.

As better shown in FIGS. 2 and 4, sliding bar 8 has an apertured T-head 9 at one end which fairly snugly receives but is slidable along data bar 7. The data bar is of channel cross section, as shown in FIG. 4, including a transverse back plate 10 and outstanding flanges 11 with inturned edges 20. Snugly received between back plate 10 and flange edges 11 are a series of separate, elongated strips 12–18, inclusive, which lie flat on plate 10 and are slidably clamped in position by a transparent window member 19.

Strips 12–18, which can be readily viewed through window 19, form the data face of the instrument. Scribed on the flange edges 20 are the centimeter and inch scales 21 and 22. At the left-hand ends of the data strips 12–18 are designations 23 of various kinds of X-ray procedures, these being listed in the present instance as chest PA (post-anterior), chest lateral, abdomen, stomach colon, bones, lumbar spine, and lumbar spine lateral. Of course, this list is merely illustrataive, and other X-ray examinations may be substituted therefor as desired by the physician or technician. At the right of these examination designations are the fixed kilovoltage designations to be used, for instance, 80 kv. p. (kilovoltage peak), etc. It is to be understood that fixed milliampere-second designations may be substituted for these kilovoltage figures if desired. Next, on each strip are the milliampere-second values to be used in accordance with the pertinent measurement of the body part to be X-rayed. For instance, on the upper strip in the 22–24 centimeter range there appear the numerals "25-1/60," meaning 25 milliamperes and 1/60 of a second exposure time. Next rightwardly on the same strip in the 24–26 centimeter range appear the numerals "50-1/60." Similarly, there appear on each strip the fixed kilovoltage or ma. s. value and the variable coordinate value in accordance with varying parts measurements. It will be understood that all of these values are carefully checked for each particular X-ray machine and associated equipment and strips 12–18 appropriately adjusted, so that no further computation will be necessary except as demanded by anatomical characteristics. Guide values for various measurements may be obtained from technique charts readily available, and these guide values will then be corrected as needed.

In use of the novel caliper, the body part of interest will be measured by being placed between base and slider parts 6 and 8 of the caliper, this measurement being taken either with the patient in position for the X-ray exposure or prior thereto. Loop part 9 at the end of slider 8 will, of course, directly designate from the data surface of bar 7 the specific value to be used, in connection with the predetermined fixed value. In this instance, the fixed values for serial registry with the slider arm are kilovoltage, while the variable values for serial registry with the slider arm are the milliampere-seconds value. In some instances, of course, still further adjustments of the machine will be necessary as indicated, for instance, by the age and disease condition of the patient. The use of filters and grids also have a bearing, and these may or may not be identified on the data face itself. The individual adjustment of the separately formed data strips 12-18 by sliding them along channel data bar 7, of course, greatly simplifies such individual adjustments as may be found necessary or desirable as the result of test exposures. These strips and window 19 may be frictionally held in place or suitable clamps or other securing elements may be provided for the purpose.

The invention may be modified in various respects as will occur to those skilled in the art, and the exclusive use of all modifications as come within the scope of the appended claim is contemplated.

We claim:

1. A direct reading technique caliper for use in determining exposure factors of a particular X-ray machine comprising an elongated data bar, a base element projecting laterally from one end of said bar, an arm slidably mounted on said bar and projecting laterally therefrom for measuring the pertinent dimension of an anatomical part to be X-rayed, and X-ray machine exposure data on said bar arranged in parallel rows therealong, said rows being formed by separate strips clamped in side-by-side relationship upon said bar and slidable relative to each other and said bar, each of said strips including designation of a particular X-ray examination and standard kilovoltage and milliampere-time designations at least in part arranged serially for registry with said arm as it moves along said bar in measuring the part to be X-rayed.

References Cited

UNITED STATES PATENTS

| | | | |
|---|---|---|---|
| 1,948,013 | 2/1934 | Turner | 33—169 |
| 2,455,522 | 11/1948 | Ringler | 235—70 |
| 3,213,541 | 10/1965 | Raffman | 33—174 |

FOREIGN PATENTS 696,073  8/1953  Great Britain.

LEONARD FORMAN, Primary Examiner

A. J. MIRABITO, Assistant Examiner